(12) United States Patent
Parekh et al.

(10) Patent No.: US 9,167,070 B2
(45) Date of Patent: Oct. 20, 2015

(54) WIDGET DISCOVERY IN COMPUTING DEVICES

(75) Inventors: Manisha Parekh, Sunnyvale, CA (US); David Champlin, Menlo Park, CA (US); Benoit Boningue, Sunnyvale, CA (US); Peter Fry, Sunnyvale, CA (US); Rick Donald, Sunnyvale, CA (US); Larry Chen, Sunnyvale, CA (US); Ryan Case, Sunnyvale, CA (US); Radha Neelakantan, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 2109 days.

(21) Appl. No.: 11/831,940

(22) Filed: Jul. 31, 2007

(65) Prior Publication Data

US 2009/0037509 A1 Feb. 5, 2009

(51) Int. Cl.
*H04M 1/725* (2006.01)
*G06F 9/445* (2006.01)
*H04L 29/08* (2006.01)

(52) U.S. Cl.
CPC ....... *H04M 1/72525* (2013.01); *G06F 9/44526* (2013.01); *H04L 67/02* (2013.01); *H04L 67/327* (2013.01); *H04L 67/34* (2013.01); *H04M 1/72561* (2013.01)

(58) Field of Classification Search
CPC .......... G06F 9/44526; H04M 1/72525; H04M 1/72561; H04L 67/327; H04L 67/02; H04L 67/34
USPC .......................................... 709/217, 219, 246
See application file for complete search history.

(56) References Cited

U.S. PATENT DOCUMENTS

| | | | |
|---|---|---|---|
| 6,430,624 B1 * | 8/2002 | Jamtgaard et al. | 709/246 |
| 6,549,612 B2 * | 4/2003 | Gifford et al. | 379/67.1 |
| 2002/0103881 A1 * | 8/2002 | Granade et al. | 709/218 |
| 2002/0119788 A1 * | 8/2002 | Parupudi et al. | 455/456 |
| 2004/0078372 A1 | 4/2004 | Huuskonen | |
| 2004/0128552 A1 * | 7/2004 | Toomey | 713/201 |
| 2004/0205156 A1 * | 10/2004 | Aarts et al. | 709/218 |
| 2007/0101291 A1 * | 5/2007 | Forstall et al. | 715/805 |
| 2007/0209013 A1 * | 9/2007 | Ramsey et al. | 715/769 |
| 2008/0294998 A1 * | 11/2008 | Pyhalammi et al. | 715/748 |

FOREIGN PATENT DOCUMENTS

| | | |
|---|---|---|
| GB | 2357403 A | 6/2001 |
| WO | WO-2009018021 A1 | 2/2009 |

OTHER PUBLICATIONS

PCT International Search Report, PCT Application No. PCT/US08/70791, Oct. 22, 2008, 7 pages.
Extended European Search Report, European Application No. 08782219.3, Jul. 5, 2012, pp. 1-6.

* cited by examiner

*Primary Examiner* — Harunur Rashid
(74) *Attorney, Agent, or Firm* — Kilpatrick Townsend Stockton LLP

(57) ABSTRACT

A system and a method are disclosed for discovering widgets for computing devices. A computing device parses data to identify rich content. The computing device searches for widgets supporting the identified rich content in a remote server and retrieves a widget supporting the identified rich content. The computing device executes the widget to process the rich content.

20 Claims, 4 Drawing Sheets

WIDGET DISCOVERY IN COMPUTING DEVICES

BACKGROUND

1. Field of Art

The disclosure generally relates to the field of mobile communication, in particular to discovering applications for mobile computing devices.

2. Description of the Related Art

Mobile computing devices such as smart phones have become part of everyday life and their usage is on the increase. As a result, more and more mobile computing device users ("mobile users") treat their mobile computing devices as a major source of information and use them to retrieve, store, process, and/or display information.

Frequently, information on a mobile computing device includes contents that require special handling. For example, content such as a mathematical formula may need special processing for proper presentation. The information may also include contents associated with additional information of the mobile user's interest. For example, a mobile user reading a short message including a movie's name is likely to be interested in show time information for the movie in local theaters. These contents are collectively called rich content. Many widgets have been developed to properly handle (or process) various types of rich content. For example, some widgets are developed to display mathematical formulas in proper format, and some other widgets are developed to provide local information (e.g., weather information) for a given geographic location. These widgets make the mobile computing devices more useful and are desirable to the mobile users. However, there is no easy mechanism for mobile users to discover widgets of interest.

Traditionally, in order to discover a widget suited for certain rich content, mobile users must search for it on Internet search engines, online forums, and/or other similar venues. However, mobile users may not necessarily know where to look for widgets, what widgets they need, or even whether they need any widget at all. Therefore, even though many interesting and useful widgets have been developed and are available for the mobile users, most users do not use the widgets.

From the above, there is a need in the art for a system and method for discovering widgets for mobile computing devices.

SUMMARY

Using various embodiments disclosed herein, mobile computing devices discover widgets for the devices. The embodiments include a system and method that enables a mobile computing device to parse data on the device to identify data segments that may be support by widgets. Data segments supported by widgets are called rich content. The system and method searches for widgets supporting the identified rich content in a remote widget warehouse server. If the system and method discovers a widget supporting any of the identified rich content in the widget warehouse server, it retrieves and executes the widget to utilize (or process) the supported rich content.

In one embodiment, a mobile computing device parses data on the device based on a criterion to identify a section of the data satisfying the criterion. The device further determines that no widget on the device is associated with the criterion before searches for widgets associated with the criterion in the widget warehouse server. In another embodiment, a mobile computing device transmits data segments to the widget warehouse server for widgets supporting the data segments.

One advantage of the disclosed configuration is that it is not necessary for users to recognize rich content in mobile computing devices and search for widgets supporting the rich content. The mobile computing devices automatically identify rich content, discover widgets supporting the rich content, and execute the widgets to utilize the rich content. As a result, minimal user action may be needed for the user to discover widgets supporting rich content in the mobile computing devices. Also, a mobile computing device may discover widgets supporting a piece of rich content even if a user of the device does not realize such widgets exist and would not otherwise search for them.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
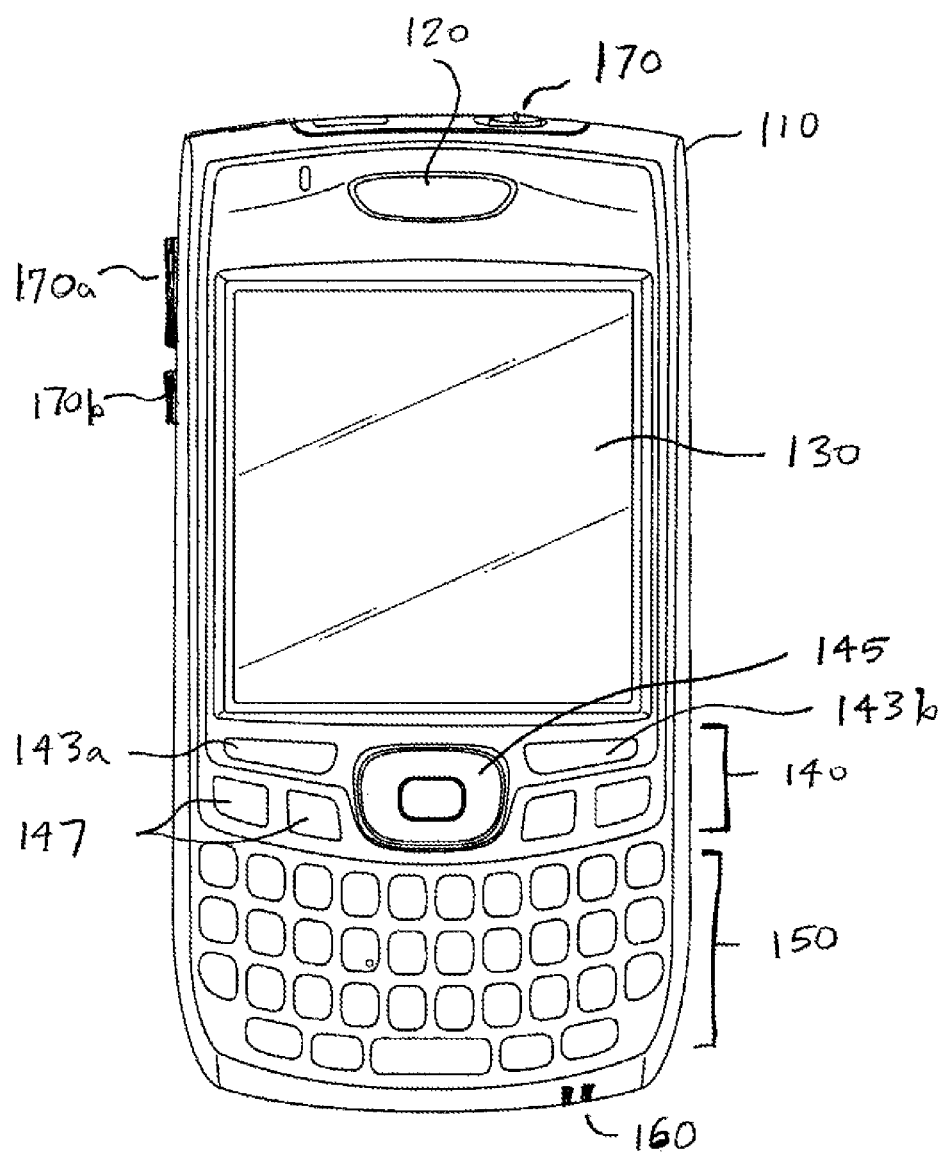
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality. Moreover, the principles disclosed herein may also be applied to other devices, such as personal digital assistants (PDAs), media players and other similar devices.

The mobile computing device 110 is configured to be of a form factor that is convenient to hold in a user's hand, for example, a personal digital assistant (PDA) or a smart phone form factor. For example, in one embodiment the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140, a keypad area 150, and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch).

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring (or joystick) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dial pad) or a numeric keypad integrated with an alpha or alphanumeric keypad (e.g., a keyboard with consecutive keys of QWERTY, AZERTY, or other equivalent set of keys on a keyboard or a Dvorak keyboard).

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
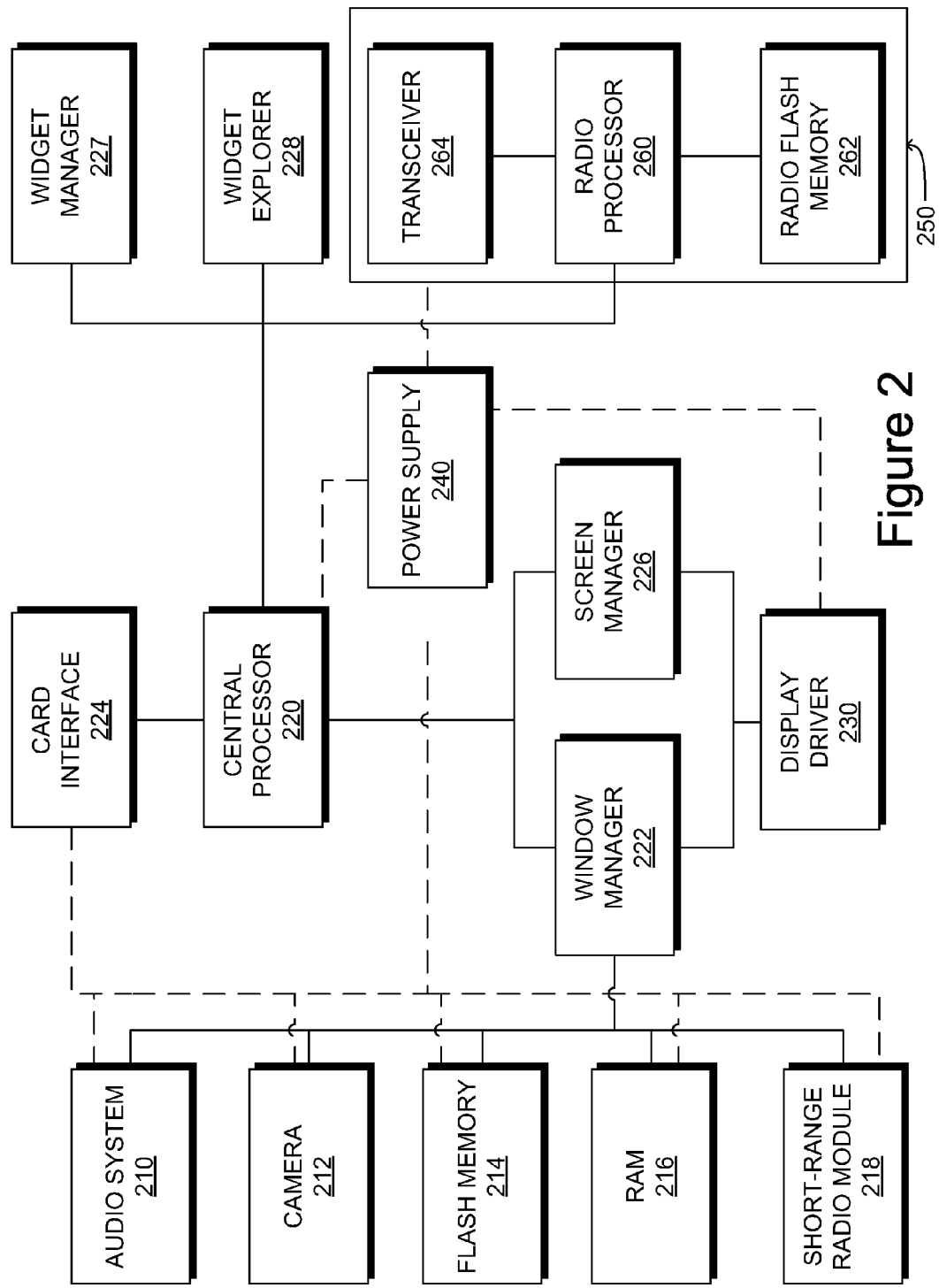
FIG. 2 illustrates one embodiment of an architecture of a mobile computing device.

Referring next to FIG. 2, a block diagram illustrates one embodiment of an architecture of a mobile computing device 110 with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, random-access memory (RAM) 216, short range radio module 218 (e.g., Bluetooth, Wireless Fidelity (WiFi) component), a window manager 222, a screen manager 226, a widget manager 227 and a widget explorer 228. The power supply 240 powers the central processor 220, the radio subsystem 250 and a display driver 230 (which may be contact- or inductive-sensitive). The power supply 240 may correspond to a battery pack (e.g., rechargeable) or a powerline connection or component.

In one embodiment, the window manager 222 comprises a software or firmware instructions for processes that initialize a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to display and modify a window, such as resizing the window along one axis, moving the window along one axis or any other command altering the appearance or position of the window, and modifies the window accordingly.

The screen manager 226 comprises a software or firmware instructions for processes that manage content displayed on the screen 130. In one embodiment, the screen manager 226 monitors and controls the physical location of data displayed on the screen 130 and which data is displayed on the screen 130. The screen manager 226 alters or updates the location of data on the screen 130 responsive to input from the central processor 220, to modify the screen 130 appearance. In one embodiment, the screen manager 226 also monitors and controls screen brightness and transmits control signals to the central processor 220 to modify screen brightness and power usage to the screen 130.

The widget manager 227 comprises a software or firmware instructions for processes that manage locally stored widgets. Widgets are software applications designed to process one or more types of data. The widgets may be stored in flash memory 214, RAM 216, and/or memory cards in the expansion slot 125. The widgets may be preinstalled and/or received through the radio subsystem 250 or the short range radio module 218. In one embodiment, the widget manager 227 manages (or tracks) the widgets and retrieves them as needed. The widget manager 227 may also store widgets as they are received and delete them as needed (e.g., limited storage resources or newer versions of local widgets received).

The widget explorer 228 comprises a software or firmware instructions for processes that identify rich content supported by widgets and retrieve the widgets supporting the identified rich content. In one embodiment, the widget explorer 228 identifies the rich content from data being processed and/or displayed by the mobile computing device 110. The widget explorer 228 may retrieve the widgets from local storage medium through the widget manager 227. The widget explorer 228 may also search for widgets supporting the identified rich content from a remote computer.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot 125. The card interface 224 transmits data and/or instructions between the central processor 220 and an expansion card or media card included in the expansion slot 125. The card interface 224 also transmits control signals from the central processor 220 to the expansion slot 125 to configure an expansion card or media card included in the expansion slot 125.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

System Environment

Figure 3:
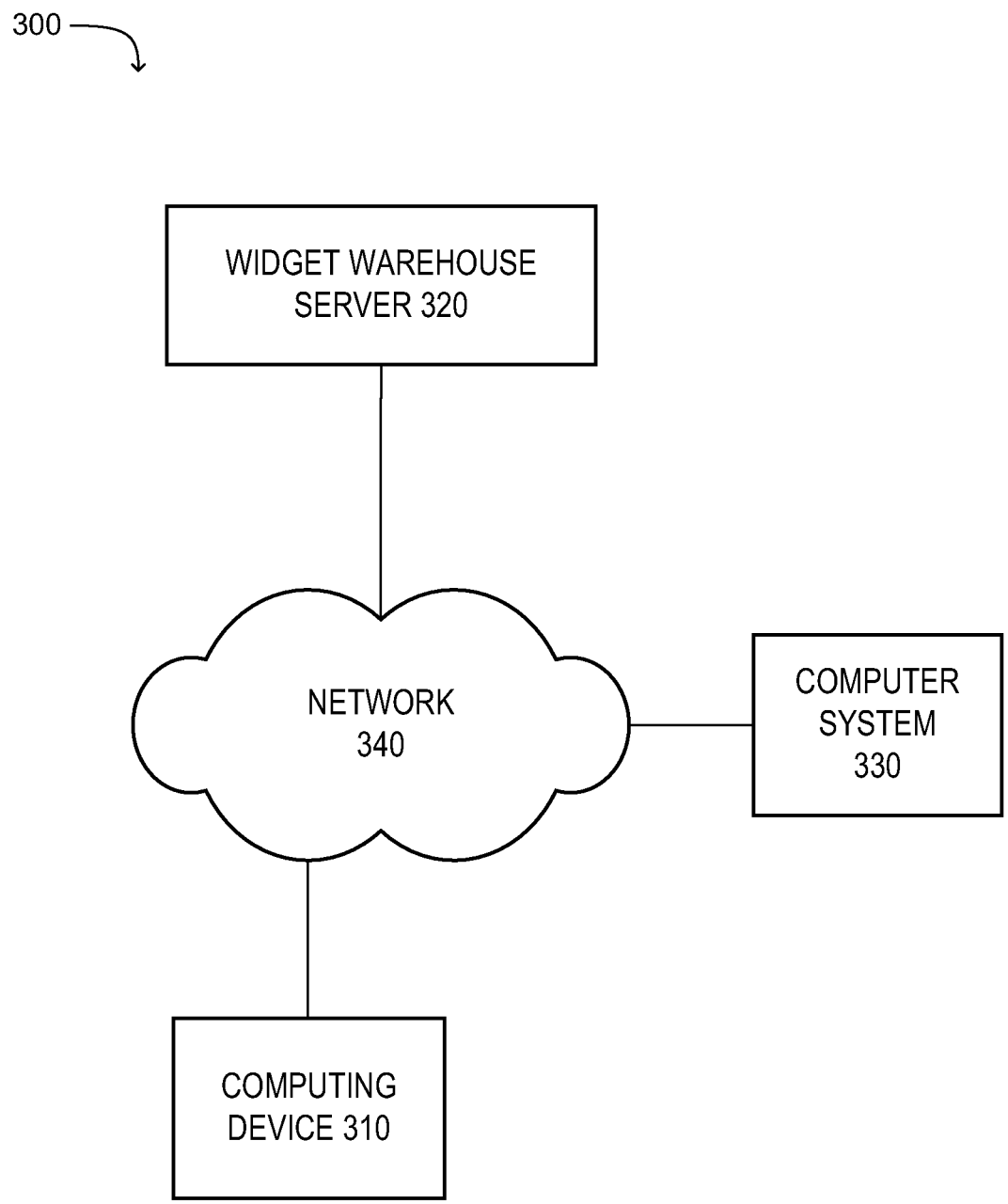
FIG. 3 illustrates one embodiment of a block diagram of a system environment for a computing device to conduct widget discovery.

FIG. 3 illustrates one embodiment of a block diagram of a system environment 300 for a computing device to conduct widget discovery. FIG. 3 illustrates a computing device 310, a widget warehouse server 320, and a computer system 330, all connected to a network 340.

A computing device 310 is a hardware and/or software device with network access capability. One example of the computing device 310 is a mobile computing device 110 as described in FIG. 1. The computing device 310 may communicate with other computing devices to transmit and/or receive data using components such as the radio subsystem 250 as illustrated in FIG. 2.

The computing device 310 may display information in output components such as the screen 130 as illustrated in FIG. 1. Examples of the displayed information include messages, e-mails, webpages, and documents. The information may be locally stored or received from other computing devices such as the computer system 330.

The information may include contents requiring special display (e.g., mathematical formulas and chemical formulas) and/or contents associated with external data desirable to users (e.g., road conditions associated with driving directions). The contents are collectively called rich content. Without special handling (or processing), the computing device may display the rich content improperly, display them without desirable additional information, or not display them at all.

The computing device 310 may execute (or run or instantiate) widgets to properly handle the rich content. Widgets are software applications designed to process a piece of data. Each widget may be developed to support (or process or handle) one or more types of data. For example, a widget (e.g., the mathematic widget) may be developed to properly display mathematical formulas in the computing device 310. As another example, another widget (e.g., the weather widget) may be developed to retrieve weather information associated with a location identified by information in the computing device 310. Each widget may be associated with one or more criteria describing the data it supports. For example, the mathematic widget is associated with criteria limiting the data to be a mathematical formula, such as regular expressions that match various mathematical formulas. One example of such regular expressions is [0-9]+[+|−|×|÷][0-9]+, which matches various mathematic formulas of two integers conducting an arithmetic operation.

The computing device 310 may store widgets in a local storage device via components such as the widget manager 227, such as the flash memory 214 and the RAM 216 as illustrated in FIG. 2. The computing device 310 may also search for, request for, and/or retrieve widgets from other computing devices, such as the computer system 330 and mobile computing devices 110 (e.g., in a peer-to-peer configuration), or the widget warehouse server 320 (e.g., in a client-server configuration) via components such as the widget explorer 228.

The criteria may be stored together with the associated widgets (e.g., in metadata of the widgets). Alternatively, the criteria and the associated widgets may be stored separately. In one embodiment, the computing device 310 may have criteria associated with widgets not stored locally, and may retrieve the widgets on demand (e.g., after identifying data satisfying the associated criteria).

The widget warehouse server 320 is a hardware and/or software device that has access to information about a collection of widgets for the computing device 310. Information about a widget may include retrieval information (e.g., a Uniform Resource Locator (URL) of the widget), criteria information (e.g., criteria describing data the widget is designed to support), descriptive information (e.g., description of the functionality of the widget), and other miscellaneous information (e.g., operating system platform, minimum free memory space, and/or other software/hardware requirements for the widget to properly operate). In one embodiment, the widget warehouse server 320 has a database storing the information and/or the widgets.

In one embodiment, the widget warehouse server 320 accepts queries searching for widgets supporting certain type(s) of rich content and/or providing certain features (or functionalities). The server 320 may search for satisfying widgets based on an accepted query and return a search result containing information about the satisfying widgets. The server 320 may have a search engine to conduct the searches. In another embodiment, the server 320 may accept a piece of data and search for widgets supporting the piece of data. For example, for a piece of data containing the following content "Alexandria, Va. 22313-1450," the server 320 will locate the weather widget because the piece of data satisfies geographic criteria associated with the weather widget. The server 320 will not locate the mathematic widget because the piece of data does not satisfy the regular expressions for mathematical formulas.

A computer system 330 is a hardware and/or software device that can communicate with the computing device 310 and/or the widget warehouse server 320 through the network 340. Examples of the computer system 330 include mobile computing devices 110, personal computers, mail servers (e.g., Microsoft Exchange), web servers (e.g., Apache Web Server), and the like.

The network 340 is configured to connect the computing device 310, the widget warehouse server 320, and the computer system 330. The network 340 may be a wired or wireless network. Examples of the network 340 include the Internet, an intranet, a WiFi network, a WiMAX network, a mobile telephone network, or a combination thereof.

It is noted that there may be multiple computing devices 310, widget warehouse servers 320, and/or computer systems 330 in the system environment 300. The multiple instances were not included in FIG. 3 for purposes of clarity.

System Operation

Figure 4:
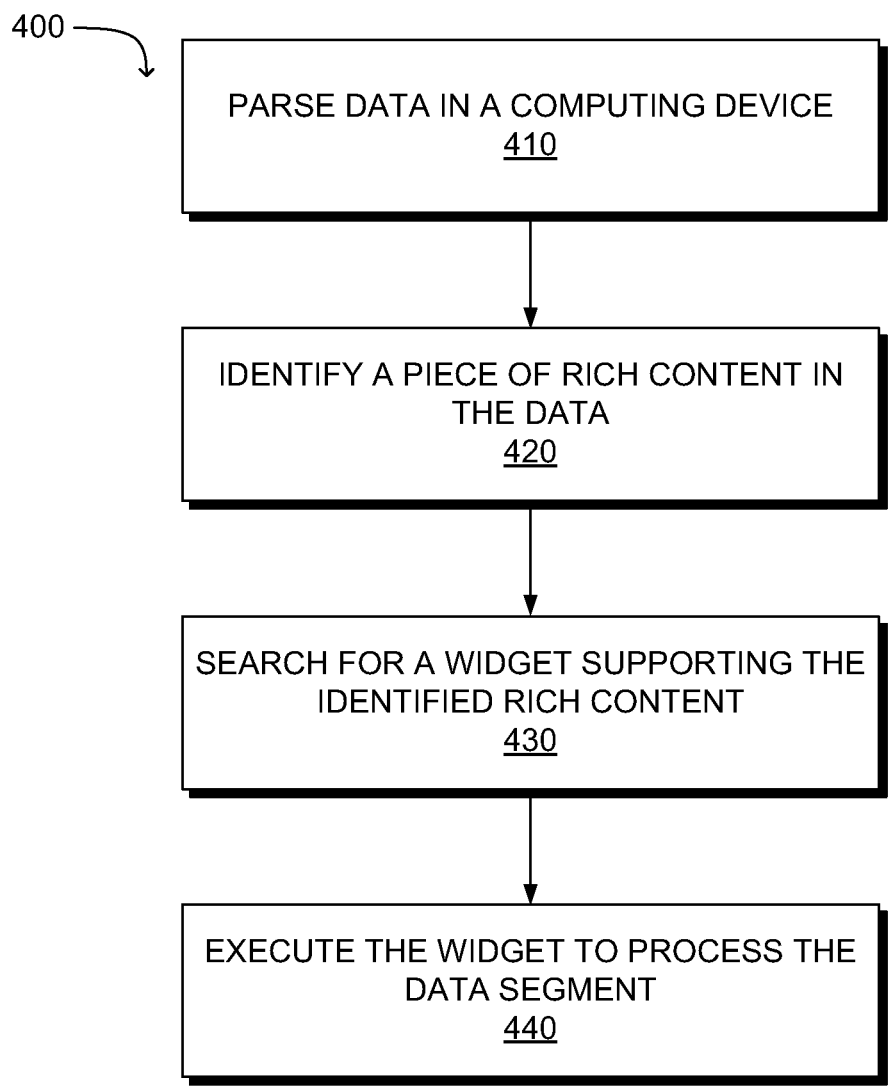
FIG. 4 illustrates one embodiment of a method for discovering widgets.

FIG. 4 illustrates a flow chart of one embodiment of a method 400 for a computing device to discover widgets. In one example, the computing device is the mobile computing devices 110 and the steps of the method 400 are implemented by the central processor 220 executing software instructions that cause the described actions. One or more portions of the method 400 may be implemented in embodiments of hardware and/or software or combinations thereof. For example, instructions for performing the described actions are embodied or stored within a computer readable medium, e.g., the flash memory 214 or the RAM 216, and are executable by a processor, such as the central processor 220. Furthermore, those of skill in the art will recognize that other embodiments can perform the steps of FIG. 4 in different orders. Moreover, other embodiments can include different and/or additional steps than the ones described here.

Initially, the computing device retrieves data for processing and/or display. The data may be retrieved from local storage such as the flash memory 214 and the RAM 216, or from other computing devices (e.g., the computer system 330) through the network 340 using, for example, protocols such as Hyper Text Transfer Protocol (HTTP), HTTP Over SSL (HTTPS), Short Message Service (SMS), Multimedia Message Service (MMS), Extensible Messaging and Presence Protocol (XMPP), Instant Messaging (IM), and the like.

The data may contain contents that may require special handling (or processing) or associated with additional information of user's interest (collectively called "rich content"). It is noted that the rich content is not limited to displayable video data. It could be audio data, graphical data, or text.

The computing device parses 410 the retrieved data to identify rich content. The computing device may execute (or run) a parser to parse 410 the data. The parser may be a stand alone applet or may be embedded in (or integrated with) applications in the computing device (e.g., email application, web browser).

In one embodiment, rich content may be defined in (or described as) one or more criteria. One example of the criteria is a regular expression. For example, a criterion for airport codes may be the following regular expressions: [A-Z][A-Z][A-Z]. This regular expression indicates that a string containing three sequential uppercase characters may be an airport code. Another example of the criteria is a formula. Examples of the formulas include formulas for well defined identifiers such as Universal Product Code (UPC) and International Standard Book Number (ISBN). Yet another example of the criteria is a keyword. Examples of the keywords include stock tickers such as MSFT for Microsoft Corp. and INTL for Intel Corp. The regular expressions, formulas, and keywords may be pre-populated (or pre-identified or predetermined or known). The pre-populated regular expressions, formulas, and keywords are collectively referred as predetermined criteria. The computing device may retrieve (and/or periodically update) the predetermined criteria from sources like the widget warehouse server 320. The predetermined criteria may also include criteria associated with widgets residing on the computing device (the local widgets).

The computing device parses 410 the retrieved data for data sections satisfying one or more of the predetermined criteria. In one embodiment, the computing device automatically parses 410 the retrieved data. In another embodiment, the computing device parses 410 the data upon user request. In still another embodiment, the computing device parses 410 data responding to the data containing a special attribute, such as a tag or a file type. In one embodiment, the computing device parses a portion of the retrieved data. For example, responding to a user selecting (or highlighting) a portion of the data, the computing device parses 410 the selected portion of the data to identify rich content.

The computing device identifies 420 one or more pieces of rich content in the data. A piece of rich content is a portion of the data matching (or satisfying) one or more of the predetermined criteria. One piece of rich content may match multiple predetermined criteria, and multiple pieces of rich content may match a same predetermined criterion.

The computing device searches 430 for widgets supporting the identified rich content. In one embodiment, the computing device first determines whether any of the local widgets supports the identified rich content by matching the rich content with criteria associated with the local widgets. If a piece of the identified rich content satisfies the criteria, the computing device executes (or runs) the associated local widgets to process (or handle) the piece of rich content.

The computing device searches 430 for widgets supporting the identified rich content in other computing devices. In one embodiment, the computing device sends a search query to a web server (e.g., the widget warehouse server 320) having access to information about a collection of widgets. In one embodiment, the search query includes criteria satisfied by the identified rich content in the data (e.g., [A-Z][A-Z][0-9][0-9][0-9]). The computing device may also prompt the user for desired features (or functionalities) and include the features in the search query. For example, after the user selecting a data segment, the computing device may pop up a window displaying "What do you want relative to the selected item?" and soliciting user input. The search query may also include system information such as the brand and model of the computing device and/or the operating system on the computing device.

The web server searches for widgets based on the criteria set forth in the search query. In one embodiment, the web server has a database storing information related to the widgets (e.g., associated criteria) and/or the widgets themselves. The web server may also have a search engine that can conduct searches for widgets associated with certain criteria or widgets supporting certain rich content (collectively called matching widgets). The web server locates matching widgets and returns them to the computing device in a search result. If no matching widget is located, the web server may log the search query and/or provide the user with an option to request one. In the search result, the web server may provide additional information about the matching widgets such as brief description of the widgets, popularity ranking, security ranking, risk factors, and other information associated with the widgets.

In another embodiment, the computing device may also send the identified rich content to the web server in addition to (or in place of) the satisfied criteria. The web server may use the rich content to verify that the rich content satisfy other criteria associated with the matching widgets. The web server may also search for other widgets not associated with the criteria, but nevertheless support the rich content.

The computing device receives a search result listing the matching widgets. In one embodiment, the computing device displays the search result and prompts the user to select one or more widgets for download and/or install. As disclosed above, the search result may include additional information to facilitate the user to make the decision.

A piece of rich content may have different meanings in different context. For example, in one context an acronym "SNA" may mean the stock ticker for Snap-on Inc. and is supported by a stock quote widget. In another context "SNA" may mean the John Wayne Airport located in Orange County, Calif. and is supported by an airport location widget. In still another context "SNA" may mean System Network Architecture and is supported by a computer vocabulary widget. A piece of rich content may also be associated with different additional information provided by different widgets. For example, the phrase "San Francisco" may be associated with local weather information provided by a weather widget, road condition information provided by a traffic widget, and historic information provided by a history widget.

To help users to identify appropriate widget(s) for the rich content, the computing device may determine a meaning of the rich content based on a context in which that rich content is identified, and provide (or prioritize) proper matching widgets to the users for selection. The context may be determined by analyzing the retrieved data using technology such as machine learning and natural language processing and/or based user's historical data (e.g., past user input and/or use of the same or similar rich content). Alternatively, the computing device may make the selection by analyzing the retrieved data using these technologies and/or information. The computing device downloads the widgets based on the ultimate selection by the user and/or the computing device.

The computing device executes (or instantiates) 440 the downloaded widgets to handle (or process) the identified rich content. In one embodiment, it may be necessary for the computing device to install the widgets before it may execute them. The computing device may prompt the user for permission before downloading, installing, and/or executing the widgets.

In one embodiment, rather than (or in addition to) searching for rich content matching predetermined criteria, the computing device parses 410 the data (or a portion of the data) to recognize patterns (or formulas, regular expressions) matching the data. For example, in a message containing the following text "I am flying in SW593 today, please pick me up at LAX," a user may highlight the phrase "SW593." The computing device identifies the following regular expression: [A-Z][A-Z][0-9][0-9][0-9], indicating that the phrase includes two consecutive uppercase characters followed by four consecutive numeric numbers. It is noted that the recognized pattern may not be a predetermined criterion.

Next, the computing device may send the recognized pattern, the data segment matching the pattern, and/or the data including the data segment to the web server. The web server reviews the pattern and determines, for example, the pattern applies to a flight number or an automobile license plate. Assuming the computing device or the server also determines that the context was with respect to flight details. Hence, the server searches for widgets supporting the data segment and/or associate with the recognized pattern for flight details.

In another embodiment, rather than (or in addition to) parsing 410 the data to identify rich content, the computing device may transmit the data (or a portion of the data) to the web server. The web server may in turn search for widgets supporting the data (or a portion of the data).

In yet another embodiment, the retrieved data may include an explicit (or direct) reference to a widget (e.g., a unique URL that identified the appropriate widget, and optionally parameters for the widget to process the associated data) associated with rich content in the data. The computing device may retrieve (or download) the widget as directed in the data.

It is noted that the rich content may contain information other than displayable information (e.g., audio data). In addition, more than one widget may be needed to fully interact with that rich content.

Example Process

The principles described herein can be further illustrated through an example of an operation of a mobile computing device in accordance with one embodiment of the invention. In this example, the mobile computing device is a web enabled phone such as a smartphone.

Initially, the smartphone receives a SMS message that reads "Let's watch the Transformers tonight." A user of the smartphone highlights the phrase "Transformers" and requests the smartphone to discover a widget that can provide information related to this term. Specifically, the smartphone parses 410 the phrase and identifies 420 it as rich content. The smartphone does not find a match on the device that matches with any predetermined criteria or recognize any pattern. The smartphone sends the phrase and the message to a warehouse server to search 430 for widgets that supports the phrase. The server identifies multiple widgets that support the phrase "Transformers," including a dictionary widget provided by Merriam-Webster®, a movie widget provided by Fandango™, and a book widget provided by Borders®. The server parses the message and determines that the phrase refers to a movie based on the context in the message, and returns a reference of the movie widget (provided by Fandango™ in this example) to the smartphone.

The user has previously set a user preference enabling the smartphone to download, install, and/or execute (or instantiate) widgets without prompting for permission. The smartphone checks the user preference, retrieves the movie widget, and executes it to process the phrase "Transformer" (e.g., by passing to the widget the phrase). The movie widget retrieves information related to the movie Transformer (e.g., from www.fandango.com) and instantiates a viewer (or window) on the smartphone to display the information. The information may leverage other information associated with the message (e.g., location specified in message) and/or the smartphone (e.g., location of the smartphone) to include local movie theaters showing the movie and the show times, user reviews, and synopses. In addition to access the information, the user may also interact with the viewer to purchase tickets online (e.g., through www.fandango.com).

The disclosed system and methods beneficially recognize rich content in a computing device and search for widgets supporting the rich content. The computing devices automatically identify rich content, discover widgets supporting the rich content, and execute the widgets to utilize the rich content. As a result, minimal user action may be needed for the user to discover widgets supporting rich content in the computing devices. Also, a computing device may discover widgets supporting a piece of rich content even if a user of the device does not realize such widgets exist and would not otherwise search for them. The disclosed embodiments also provide a mechanism to manage widgets in a computing device.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for identifying rich content and discovering widgets supporting the rich content through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method for discovering software applications remote from a mobile computing device, the method comprising:
    parsing data displayed on a screen of the mobile computing device to recognize a predetermined criterial pattern matching at least a portion of the displayed data;
    identifying, responsive to successfully recognizing the criterial pattern, the at least a portion of the displayed data matching the criterial pattern as rich content that can be augmented by external data;
    transmitting, responsive to identifying the rich content, a request for a software application associated with the criterial pattern along with an identifier that uniquely identifies the criterial pattern to a remote server;
    receiving a response corresponding to the request from the remote server, the response including the software application associated with the criterial pattern; and
    executing the software application on the mobile computing device to retrieve the external data and to augment the rich content by the retrieved external data.

2. The method of claim 1, wherein the displayed data comprises at least one selected from a group comprising a message, an email, a document, and a web page, wherein the response includes descriptive information for a plurality of software applications associated with the criterial pattern, and wherein executing the software application on the mobile computing device comprises:
    displaying the descriptive information for the plurality of software applications for user selection; and
    receiving a user input selecting the software application from the plurality of software applications.

3. The method of claim 1, wherein transmitting the request comprises:
    transmitting the at least a portion of the displayed data to the remote server for a software application associated with a second criterial pattern matching the at least a portion of the displayed data.

4. The method of claim 1, wherein the criterial pattern comprises at least one of a pre-populated regular expression, a pre-populated formula, and a pre-identified keyword.

5. The method of claim 1, wherein the response comprises a plurality of software applications associated with the criterial pattern, the method further comprising:
    determining a meaning of the rich content based on a context in which the rich content is identified; and
    selecting the software application from the plurality of software applications based on the meaning of the rich content; and
    installing the software application in the computing device.

6. The method of claim 1, further comprising:
displaying descriptive information and security information of the software application;
prompting a user input for whether to execute the software application; and
receiving a user input to execute the software application, wherein executing the software application comprises:
executing, responsive to receiving the user input, the software application on the mobile computing device to retrieve the external data and to augment the rich content by the retrieved external data.

7. The method of claim 1, further comprising:
searching for the software application associated with the criterial pattern in a plurality of software applications residing on the mobile computing device; and
storing the software application in the response together with the plurality of software applications residing on the mobile computing device.

8. The method of claim 1, wherein parsing the displayed data comprises:
receiving a user input selecting a portion of the displayed data; and
parsing the selected data portion to recognize a predetermined criterial pattern matching the selected data portion, the method further comprising:
prompting a user input for a desired category of information related to the selected data portion, and
receiving a user input comprising the desired category, wherein the request comprises a request for a software application associated with the criterial pattern and the desired category.

9. A non-transitory computer readable medium with stored instructions, the instructions when executed by a processor cause the processor to perform a method comprising:
parsing data displayed on a screen of a mobile computing device to recognize a predetermined criterial pattern matching at least a portion of the displayed data;
identifying, responsive to successfully recognizing the criterial pattern, the at least a portion of the displayed data matching the criterial pattern as rich content that can be augmented by external data;
transmitting, responsive to identifying the rich content, a request for a software application associated with the criterial pattern along with an identifier that uniquely identifies the criterial pattern to a remote server;
receiving a response corresponding to the request from the remote server, the response including the software application associated with the criterial pattern; and
executing the software application on the mobile computing device to retrieve the external data and to augment the rich content by the retrieved external data.

10. The non-transitory computer readable medium of claim 9, wherein the displayed data comprises at least one selected from a group comprising a message, an email, a document, and a web page, wherein the response includes descriptive information for a plurality of software applications associated with the criterial pattern, and wherein executing the software application on the mobile computing device comprises:
displaying the descriptive information for the plurality of software applications for user selection; and
receiving a user input selecting the software application from the plurality of software applications.

11. The non-transitory computer readable medium of claim 9, wherein transmitting the request comprises:
transmitting the at least a portion of the displayed data to the remote server for a software application associated with a second criterial pattern matching the at least a portion of the displayed data.

12. The non-transitory computer readable medium of claim 9, wherein the criterial pattern comprises at least one of a pre-populated regular expression, a pre-populated formula, and a pre-identified keyword.

13. The non-transitory computer readable medium of claim 9, wherein the response comprises a plurality of software applications associated with the criterial pattern, the method further comprising:
determining a meaning of the rich content based on a context in which the rich content is identified; and
selecting the software application from the plurality of software applications based on the meaning of the rich content; and
installing the software application in the computing device.

14. The non-transitory computer readable medium of claim 9, wherein the method further comprises:
displaying descriptive information and security information of the software application;
prompting a user input for whether to execute the software application; and
receiving a user input to execute the software application, wherein executing the software application comprises:
executing, responsive to receiving the user input, the software application on the mobile computing device to retrieve the external data and to augment the rich content by the retrieved external data.

15. A mobile computing device, comprising:
a radio unit configured to communicate with a network;
a non-transitory computer readable medium configured to store instructions; and
a processing unit coupled to the radio unit and the non-transitory computer readable medium, the processing unit configured to execute the instructions, the instructions configured to cause the processing unit to perform a method comprising:
parsing data displayed on a screen of the mobile computing device to recognize a predetermined criterial pattern matching at least a portion of the displayed data;
identifying, responsive to successfully recognizing the criterial pattern, the at least a portion of the displayed data matching the criterial pattern as rich content that can be augmented by external data;
transmitting, responsive to identifying the rich content, a request for a software application associated with the criterial pattern along with an identifier that uniquely identifies the criterial pattern to a remote server;
receiving a response corresponding to the request from the remote server, the response including the software application associated with the criterial pattern; and
executing the software application on the mobile computing device to retrieve the external data and to augment the rich content by the retrieved external data.

16. The mobile computing device of claim 15, wherein the displayed data comprises at least one selected from a group comprising a message, an email, a document, and a web page, wherein the response includes descriptive information for a plurality of software applications associated with the criterial pattern, and wherein executing the software application on the mobile computing device comprises:
displaying the descriptive information for the plurality of software applications for user selection; and
receiving a user input selecting the software application from the plurality of software applications.

17. The mobile computing device of claim 15, wherein transmitting the request comprises:
   transmitting the at least a portion of the displayed data to the remote server for a software application associated with a second criterial pattern matching the at least a portion of the displayed data.

18. The mobile computing device of claim 15, wherein the criterial pattern comprises at least one of a pre-populated regular expression, a pre-populated formula, and a pre-identified keyword.

19. The mobile computing device of claim 15, wherein the response comprises a plurality of software applications associated with the criterial pattern, the method further comprising:
   determining a meaning of the rich content based on a context in which the rich content is identified; and
   selecting the software application from the plurality of software applications based on the meaning of the rich content; and
   installing the software application in the computing device.

20. The mobile computing device of claim 15, wherein the method further comprises:
   displaying descriptive information and security information of the software application;
   prompting a user input for whether to execute the software application; and
   receiving a user input to execute the software application, wherein executing the software application comprises:
      executing, responsive to receiving the user input, the software application on the mobile computing device to retrieve the external data and to augment the rich content by the retrieved external data.

* * * * *